(12) United States Patent
Addis

(10) Patent No.: US 7,458,584 B2
(45) Date of Patent: Dec. 2, 2008

(54) REVERSE FLOW TOLERANT BRUSH SEAL

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/711,583

(22) Filed: Feb. 27, 2007

(65) Prior Publication Data

US 2008/0203671 A1  Aug. 28, 2008

(51) Int. Cl.
F16J 15/44 (2006.01)
(52) U.S. Cl. ...................................... 277/355
(58) Field of Classification Search ................... 277/355
See application file for complete search history.

(56) References Cited

U.S. PATENT DOCUMENTS

| | | | |
|---|---|---|---|
| 3,346,008 A | | 10/1967 | Scaramucci |
| 3,906,730 A | * | 9/1975 | Bellati et al. ................. 60/657 |
| 4,243,067 A | | 1/1981 | Rubey |
| 4,781,213 A | | 11/1988 | Kilayko |
| 5,192,084 A | | 3/1993 | Norbury |
| 5,732,731 A | | 3/1998 | Wafer |
| 5,799,952 A | * | 9/1998 | Morrison et al. ............ 277/355 |
| 6,250,879 B1 | * | 6/2001 | Lampes .................... 415/174.2 |
| 6,416,057 B1 | | 7/2002 | Adams et al. |
| 6,428,009 B2 | | 8/2002 | Justak |
| 6,505,834 B1 | | 1/2003 | Dinc et al. |
| 6,910,857 B2 | | 6/2005 | Addis |
| 6,991,235 B2 | * | 1/2006 | Ebert et al. .................. 277/355 |
| 6,996,885 B2 | | 2/2006 | Szymbor et al. |
| 7,000,923 B2 | | 2/2006 | Addis |
| 7,033,134 B2 | | 4/2006 | Bristol et al. |
| 2004/0026869 A1 | * | 2/2004 | Addis ......................... 277/355 |
| 2005/0206087 A1 | | 9/2005 | Hogg et al. |
| 2006/0125190 A1 | | 6/2006 | Addis |
| 2006/0192343 A1 | * | 8/2006 | Hashiba et al. ............. 277/355 |

FOREIGN PATENT DOCUMENTS

DE  10 2004 047206 A  4/2006
EP  0778431 A  6/1997

* cited by examiner

Primary Examiner—Alison K Pickard
(74) Attorney, Agent, or Firm—Colin L. Cini

(57) ABSTRACT

In accordance with the present application, a fluid seal 30 and fluid sealing element 32, which are tolerant of fluid F direction reversals are provided. A sealing element 32 has at least two brush stages 50 to restrict leakage of the fluid F through a gap 38 between a component and a sealing surface. Each brush stage 50 includes a bristle arrangement 44 sandwiched between a back plate 48 and a common mid plate 46. A value allows 70 the fluid F to bypass a bristle arrangement 44 if the fluid pressure P1 or P2 varies between the chambers. Permanent damage to the sealing element 32 is avoided by allowing the higher pressure fluid F to bypass the upstream bristle arrangement 44 and a properly load the downstream bristle arrangement against a back plate 48.

20 Claims, 4 Drawing Sheets

REVERSE FLOW TOLERANT BRUSH SEAL

BACKGROUND OF THE INVENTION

(1) Field of the Invention

The present application relates to restricting the transfer of a fluid from between two pressurized chambers, and more specifically to a reverse flow tolerant brush seal for restricting the transfer of pressurized air between chambers in various gas turbine engine applications.

(2) Description of the Related Art

Gas turbine engines operate according to a continuous-flow, Brayton cycle. A forward compressor section pressurizes ambient air, fuel is added and the pressurized mixture is burned in a central combustor section. The combustion gases expand through a rearward turbine section before a rearmost nozzle expels the gases as a propulsive jet. Bladed rotors in the turbine section convert thermodynamic energy from the combustion gases into mechanical energy for rotating one or more centrally mounted shafts. The shafts, in turn, drive the forward compressor section, thus continuing the cycle. Gas turbine engines are compact and efficient power plants for powering aircraft, heavy equipment, waterborne vehicles and electrical power generators.

The interfaces between adjacent engine components are sealed in various ways to restrict leakage of fluids such as the pressurized compressor air and combustion gases. There are many interfaces between rotating and stationary components in a gas turbine engine. Sealing these interfaces presents challenges due to the excessive fluid temperatures and pressures, combined with relative axial and/or radial movement between the engine components.

Brush seals, such as disclosed in U.S. Pat. No. 6,910,857, Ser. No. 10/330,751, to Addis, provide a restriction to fluid leakage between components that are subject to relative axial and/or radial movement. Bristles with flexible ends bridge a gap between adjacent components and any relative movement is absorbed through deflection of the bristles. The tortuous path through the bristles achieves the restriction effect even as the gap distance changes.

Brush seal bristles are also susceptible to deflection due to fluid pressure loading. For this reason, back plates and side plates support the bristles along a majority of their length. The bristles are loaded against the back plate by the fluid pressure, thus preventing permanent deflection. The side plates are scalloped where they contact the bristles to provide a space for bristle flexure and to allow any frictional heat to dissipate out of the bristles.

An undesirable consequence of the side plate scallop is the reduced support it provides the bristle ends. For this reason, brush seals are designed to have the bristles continuously loaded in one direction, against the back plates. Brush seals are used in applications where a continuous pressure differential exists. If a brush seal is installed in reverse or an unanticipated flow reversal occurs, the unsupported bristles will deflect under pressure. Bristle deflections eventually yield the bristle ends, reducing their sealing effectiveness and rendering them unacceptable for continued service. Reduced brush seal effectiveness will increase fluid leakage, engine fuel burn and, in turn, reduce an operator's profit until the brush seal is replaced. Removal and disassembly of a gas turbine engine for brush seal replacement is both costly and time consuming.

Experience shows that flow reversals can occur under certain gas turbine operating conditions, thus precluding the use of brush seals in certain applications. A brush seal that is tolerant of flow reversals is presently needed.

BRIEF SUMMARY OF THE INVENTION

In accordance with the present application, a fluid seal and fluid sealing element, which are tolerant of flow direction reversals are provided. A sealing element has at least two brush stages to restrict leakage of a fluid through a gap between components to form a seal. Each brush stage includes a bristle arrangement disposed between a back plate and a common mid plate. A valve allows the fluid to bypass a bristle arrangement if the fluid pressure varies between the chambers. By allowing the higher pressure fluid to bypass one of the bristle arrangements and properly load the other bristle arrangement against a back plate, permanent damage to the sealing element is avoided.

These and other objects, features and advantages of the present invention will become apparent in view of the following detailed description and accompanying figures of multiple embodiments, where corresponding identifiers represent like features between the various figures.

DETAILED DESCRIPTION OF THE INVENTION

Figure 1:
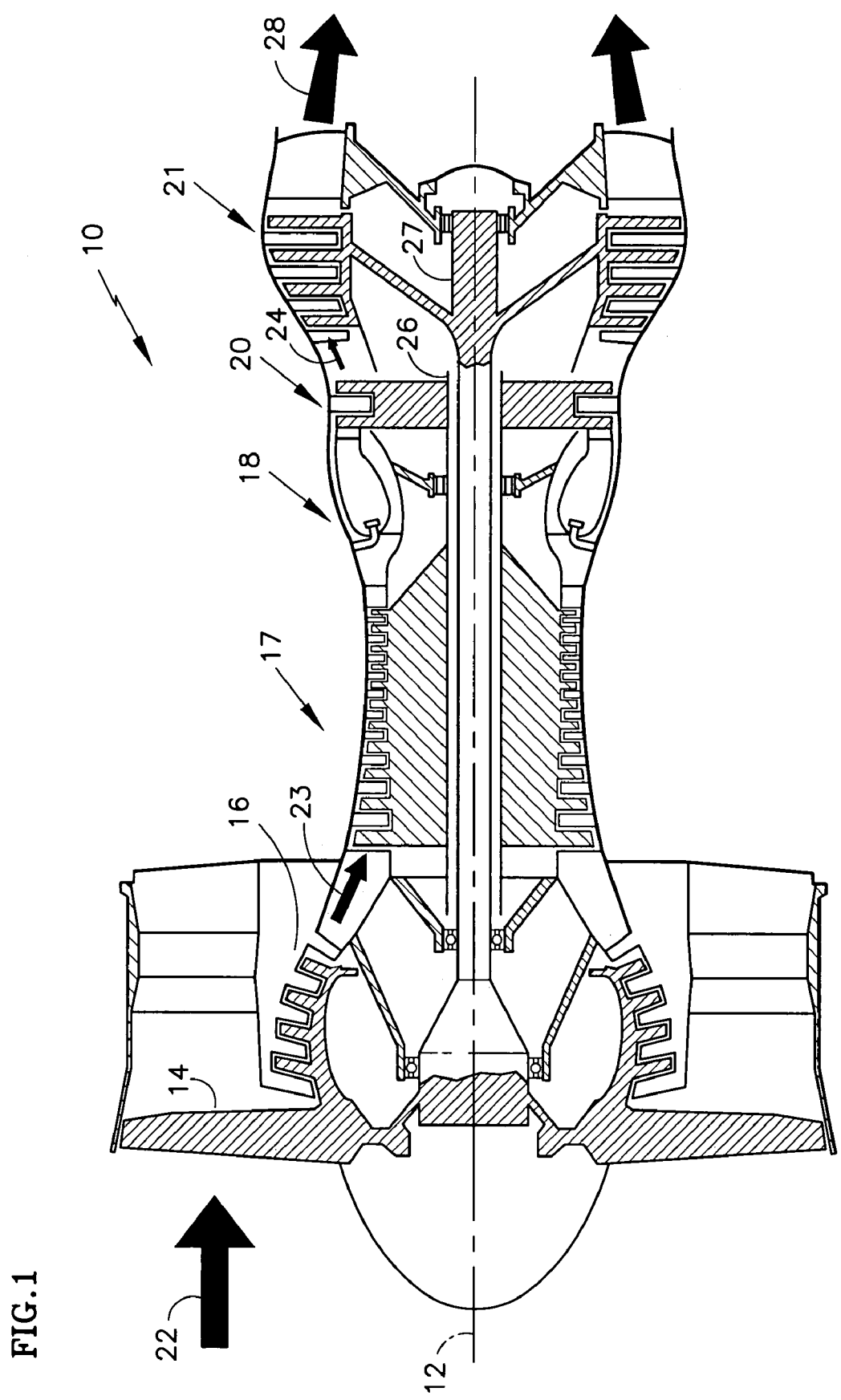
FIG. 1 is a simplified cross sectional view of a gas turbine engine.

A gas turbine engine 10, such as a turbofan gas turbine engine, circumferentially disposed about a longitudinal axis or axial centerline 12, is illustrated in FIG. 1. The engine 10 includes a fan 14, low and high pressure compressor sections 16 and 17, a combustor section 18 and high and low pressure turbine sections 20 and 21. This application extends to engines with a gear driven fan, and engines with more or fewer sections. As is well known in the art, incoming ambient air 22 becomes pressurized air 23 in the compressors 16 and 17. The pressurized air 23 is mixed with fuel and burned in the combustor section 18 and combustion gases 24 expand through turbine sections 20 and 21. The turbine sections 20 and 21 drive high and low rotor shafts 26 and 27, which rotate in response to the combustion gases 24 and drive the attached compressor sections 16 and 17, and fan 14. The combustion gases 24 are finally expelled from the rear of the engine 10 as a propulsive jet 28. Seals located at the interfaces of the various components restrict leakage of the pressurized air, combustion gases and other fluids inside the engine 10. It is to be understood that this figure is included simply to provide a basic understanding and overview of the various sections and operation of a gas turbine engine. It will become apparent to those skilled in the sealing art that the present application is applicable to all types of gas turbine engines, as well as other mechanical devices.

Figure 2:
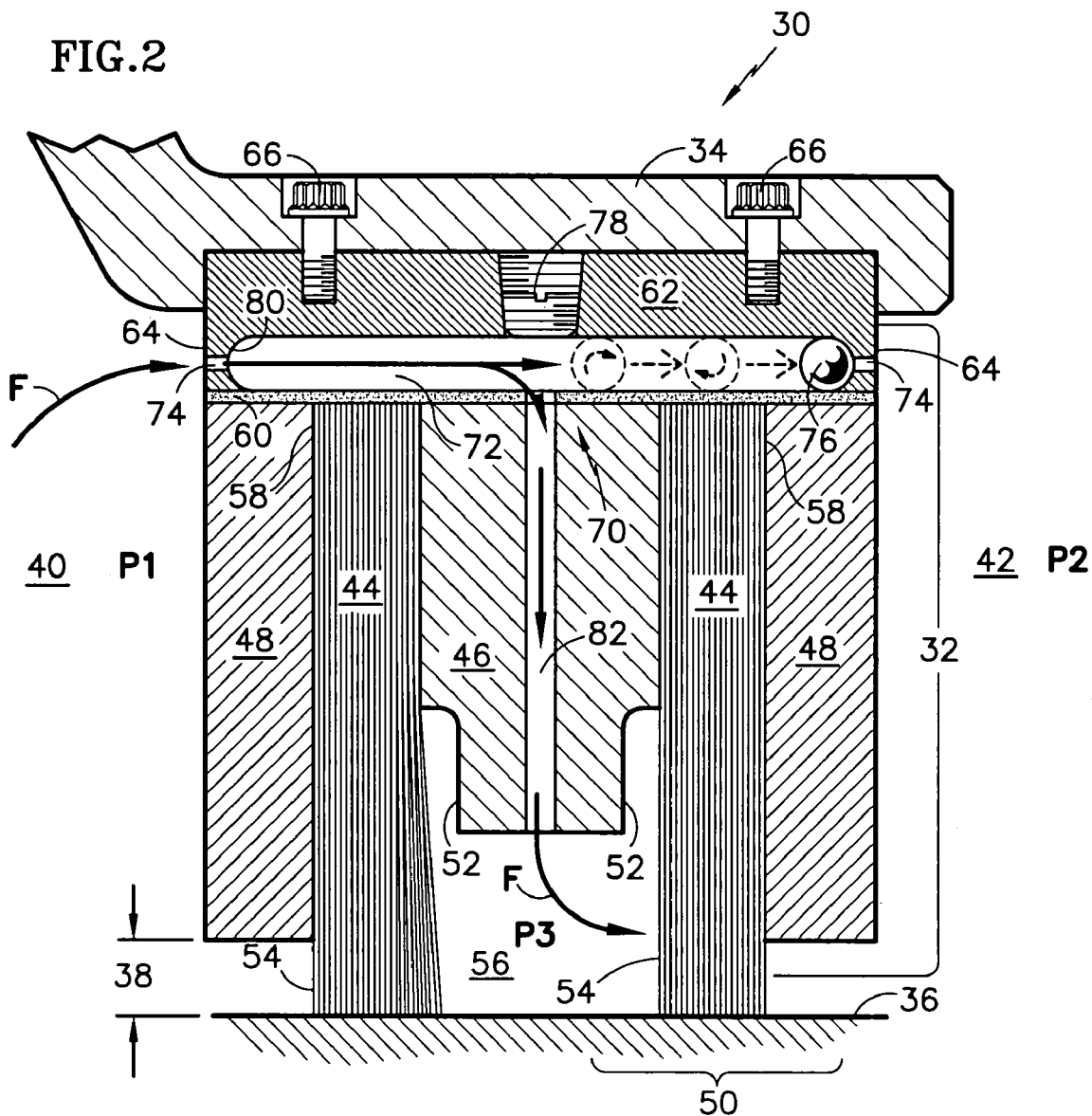
FIG. 2 is a cross sectional view of a brush seal assembly where pressure P1 is higher than pressure P2.
Figure 3:
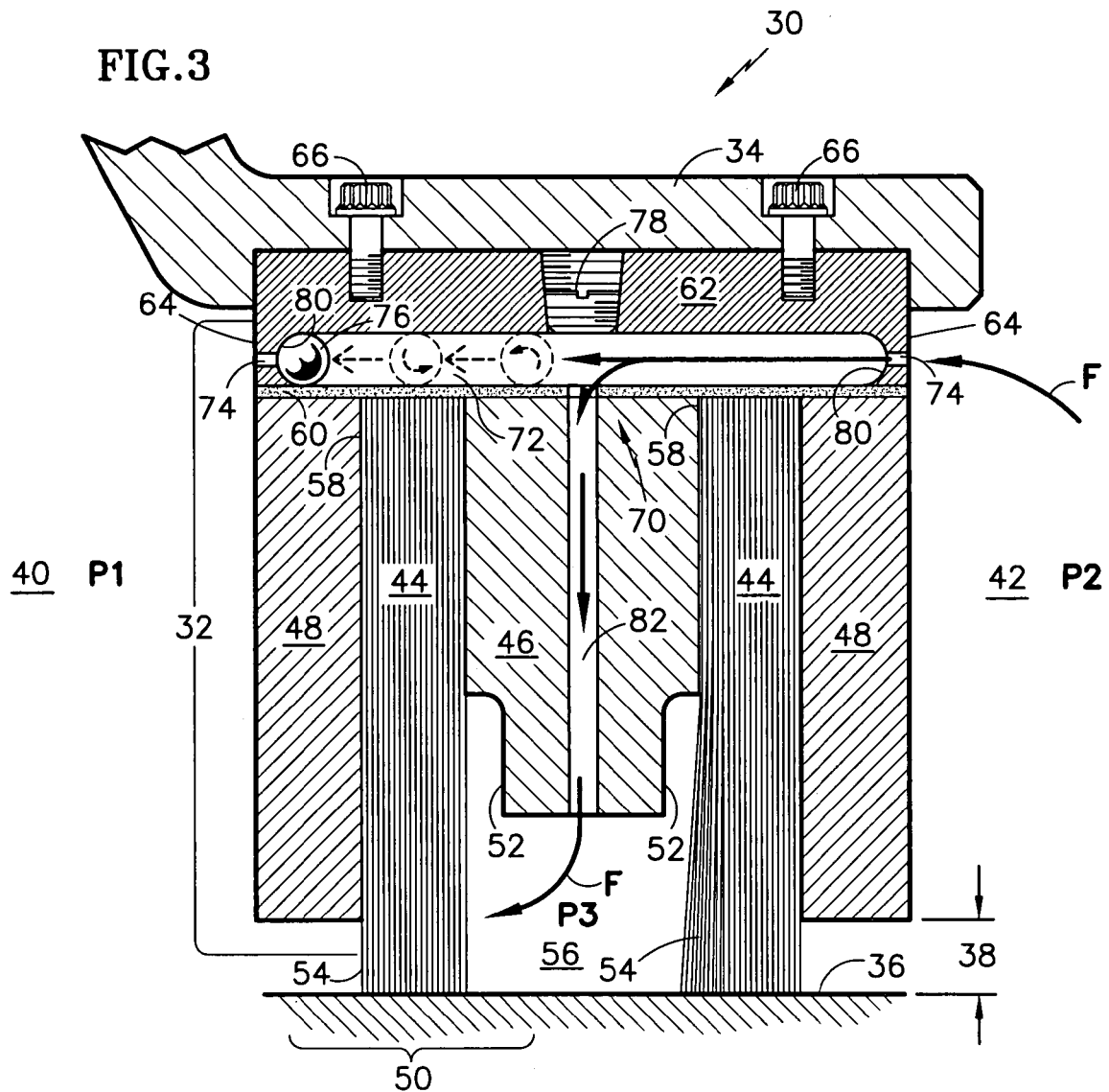
FIG. 3 is a cross sectional view of the brush seal assembly of FIG. 2, where pressure P2 is higher than pressure P1.

Referring now to both FIGS. 2 and 3, an embodiment of a reverse flow tolerant brush seal assembly 30 is illustrated. A sealing element 32 extends between a supporting structure 34 and a sealing surface 36. The sealing surface 36 may contain a wear resistant coating layer applied to a component such as a shaft. The supporting structure 34 and/or sealing surface 36 may be stationary or rotating in relation to one another. If both the support structure 34 and sealing surface 36 are rotating, they may co-rotate or counter rotate. The sealing element 32 provides a restriction of pressurized fluid F through a gap 38 between first 40 and second 42 cavities of pressures P1 and P2 respectively. Please note that in FIG. 2, fluid pressure P1 is greater than pressure P2 and in FIG. 3, fluid pressure P2 is greater than pressure P1. In each example of FIGS. 2 and 3, the fluid F transfers from the higher pressure cavity to the lower pressure cavity.

According to the present embodiment of the sealing element 32 illustrated in FIGS. 2 and 3, at least two bristle arrangements 44 are sandwiched between a central, mid plate 46 and outer back plates 48. The mid plate 46 and back plates 48 are made from high strength, corrosion resistant materials such as Nickel based alloy, Stainless Steel or similar material for example. The mid plate 46, bristle arrangement 44 and back plate 48 create a single brush stage 50 restrictor to the transfer of fluid F. The mid plate 46 may contain scallops 52 at the bristle arrangement 44 interface to allow for bristle arrangement 44 deflection and the dissipation of excess heat due to friction. Although the mid plate 46 is shown as a single element in the Figures, it may in fact be two separate, abutting plates.

The bristle arrangements 44 comprise a multitude of individual wires made from a high strength, corrosion resistant material such as Nickel based alloy, Stainless Steel or similar material for example. The bristle arrangements 44 have free ends 54 extending beyond the back plates 48, bridging the gap 38, and contacting the sealing surface 36. The bristle arrangements 44 are typically canted at an angle to the sealing surface 36 to allow flexibility and to reduce wear on the sealing surface 36. A bypass chamber 56 is formed between the mid plate 46, the free ends 54 and the sealing surface 36. Opposite the free ends 54 are fixed ends 58, which are sandwiched between the mid 46 and back 48 plates. The bristle arrangements 44 may be joined to the plates 46, 48 at a joint 60 such as weld, solder or braze (shown), or by clamping means (not shown). Examples of applicable clamping means are disclosed in U.S. Pat. No. 7,000,923, Ser. No. 10/754,955, to Addis, and United States patent application No. 2006/0125190, Ser. No. 11/011,230, to Addis, each herein incorporated by reference. The bristle arrangements 44 may be independently formed prior to sandwiching as disclosed in U.S. Pat. No. 6,996,885, Ser. No. 10/103,629, to Szymbor and Addis, herein incorporated by reference.

A carrier 62 extends across the brush stages 50, with end surfaces 64 exposed to the first and second chambers 40, 42. The carrier 64 is joined to the brush stages 50 at weld joint 60 (shown) or may be joined by other means such as bolting, riveting or clamping (not shown). The carrier 62 is affixed to the support structure 34 by bolts 66 (shown), or other means known in the art (not shown).

A bypass valve 70 in the sealing element 32 allows the fluid F to bypass a bristle arrangement 44 when the fluid pressures P1 and P2 vary. A pressure conduit 72 in the carrier 62 fluidly couples each of the first 40 and second 42 chambers via inlet apertures 74 at each end surface 64. A spherical ball 76, introduced through a threaded cap 78, is captured in the pressure conduit 72. The spherical ball 76 is made of stainless steel, composite material, or other suitable material. The pressure conduit 72 is appropriately sized to ensure that the spherical ball 76 freely rolls along its length. Concave seats 80 transition the pressure conduit 72 to the inlet apertures 74 and are sized to allow the spherical ball 76 to mate with the seats 80, thus blocking the inlet apertures 74. A bypass conduit 82 in the mid plate 46 fluidly couples the pressure conduit 72 to the bypass chamber 56.

A sealing element 32 may contain a single bypass valve 70 or preferably, several bypass valves 70 are spaced between the first 40 and second 42 chambers. The individual elements of the bypass valve 70 are sized to ensure the bypass valve 70 does not create a restriction to fluid F transfer itself. For example, the cross sectional areas of each of the inlet 74, pressure conduit 72 and bypass and bypass conduit 82 are sized to permit unrestricted fluid F transfer. This is especially important where larger P1 to P2 pressure differentials exist.

Referring now specifically to FIG. 2, the operation of the bypass valve 70 when fluid F pressure P1 is higher than pressure P2 is disclosed in greater detail. The higher pressure P1 of the first chamber 40 forces the fluid F to enter the pressure conduit 72 through the inlet 74 adjacent to the first chamber 40. The force of higher pressure P1 acts on the spherical ball 76, causing it to roll in the pressure conduit 72, until it mates with the seat 80. Once seated, the spherical ball 76 blocks the inlet aperture 74 adjacent to the second chamber 42, which is at a lower pressure P2. The fluid F cannot exit the pressure conduit 72 and must enter the bypass conduit 82. Now in the bypass conduit 82, the fluid F travels through the mid plate 46 and into the bypass chamber 56. The pressure P3 of the bypass chamber 56 now equals the pressure P1 of the first chamber 40. Since the pressure P3 of the bypass chamber 56 is now higher than the pressure P2 of the second chamber 42, the free ends 54 of the bristle arrangement 44 adjacent to the second chamber 42 are properly loaded against the back plate 48. Please note that the free ends of the bristle arrangement 44 adjacent to the first chamber 40 are unloaded since the pressure P3 of the bypass chamber 56 is now equal to the pressure P1 of the first chamber.

Referring now specifically to FIG. 3, the operation of the valve 70 when pressure P2 is higher than pressure P1 is disclosed in greater detail. The higher pressure P2 of the second chamber 42 forces the fluid F to enter the pressure conduit 72 through the inlet aperture 74 adjacent to the second chamber 42. The force of higher pressure P2 acts on the spherical ball 76, causing it to roll in the pressure conduit 72, until it mates with the seat 80. Once seated, the spherical ball 76 blocks the inlet aperture 74 adjacent to the first chamber 40, which is at a lower pressure P1. Once the spherical ball 76 is loaded against the seat 80, the fluid F cannot exit the pressure conduit 72 and must enter the bypass conduit 82. Now in the bypass conduit 82, the fluid F travels through the mid plate 46 into the bypass chamber 56. The pressure P3 of the bypass chamber 56 now equals the pressure P2 of the second chamber 42. Since the pressure P3 of the bypass chamber 56 is now higher than the pressure P1 of the first chamber 40, the free ends 54 of the bristle arrangement 44 adjacent to the first chamber 40 are properly loaded against the back plate 48. Please note that the free ends of the bristle arrangement 54 adjacent to the second chamber 42 are unloaded since the pressure P3 of the bypass chamber 56 is now equal to the pressure P2 of the second chamber 42.

As clearly demonstrated by the above examples, the free ends 54 of the bristle arrangements 44 are unaffected by fluid F direction reversals caused by fluctuations in pressure P1 and P2. In FIG. 2, the bristle arrangement 44 adjacent to the first chamber 40 is bypassed and in FIG. 3 the bristle arrangement 44 adjacent to the second chamber 42 is bypassed. In each example, the free ends 54 of the downstream bristle arrangements 44 are properly loaded against the back plate 48 and the upstream bristle arrangements 44 are unloaded. By preventing the bristle arrangements 44 from being loaded against the scalloped mid plate 46, they are not permanently damaged and remain in operational service.

Figure 4:
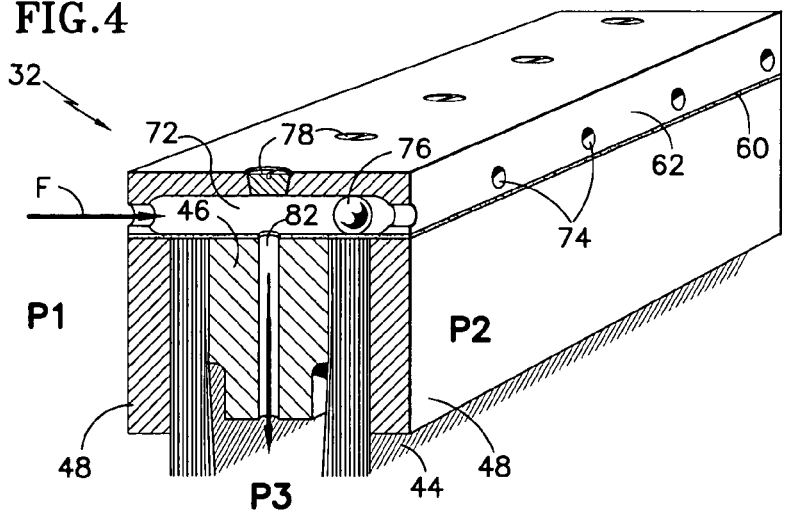
FIG. 4 is a cross sectional, perspective view of a linear brush seal assembly where pressure P1 is higher than pressure P2.
Figure 5:
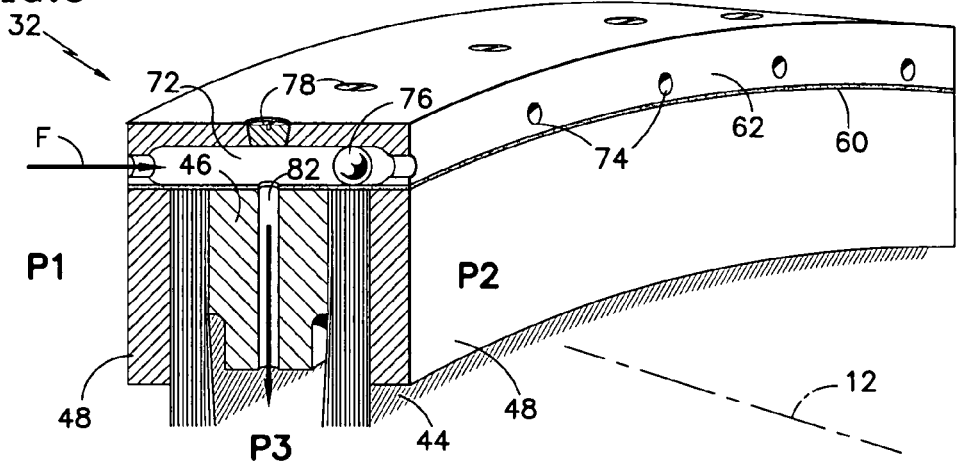
FIG. 5 is a cross sectional, perspective view of a segmented, arcuate brush seal assembly where pressure P1 is higher than pressure P2.
Figure 6:
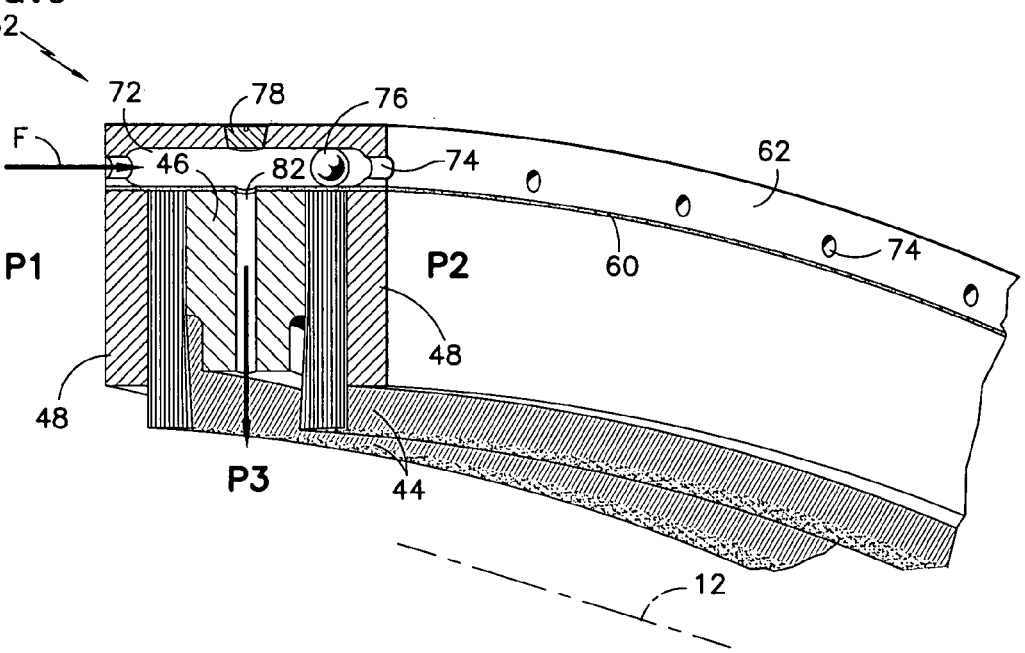
FIG. 6 is a cross sectional, perspective view of a full ring brush seal assembly where pressure P1 is higher than pressure P2.

As further illustrated in FIGS. 4, 5, 6, the sealing element 32 may be linear (FIG. 4), a segmented arc (FIG. 5), or a full ring (FIG. 6) respectively. The configuration of the sealing element 32 depends on the location of the components to be sealed and the sequence of assembly. For example, if a sealing element 32 installs around an existing shaft, it will preferably be made of a segmented arc as in FIG. 5. Feather seals or shiplap seals, or similar sealing means will seal the gaps between adjacent segments. The sealing elements 32 may be oriented with the spherical ball 76 rolling horizontally, vertically or at any another angle as long as the pressure differential P1 to P2 is strong enough to overcome the mass of the spherical ball. This is especially true in a vertical orientation, where the spherical ball 76 will generally seek the lowest seat 80 position.

As those skilled in the art appreciate having read the preceding application, the seal assembly 30 and sealing element 32 of the present application are suited for installations where fluid F reversals are known to occur. New sealing installations, where insufficient data exists to determine if the fluid F direction under all operating conditions, will similarly benefit from the present application. Lastly, sealing applications where fluid F reversals infrequently occur, but occur with damaging results, will equally benefit.

Other alternatives, modifications and variations will become apparent to those skilled in the art having read the foregoing description. Accordingly, the invention embraces those alternatives, modifications and variations as fall within the broad scope of the appended claims.

What is claimed is:

1. A reverse flow tolerant brush seal element for restricting the transfer of a pressurized fluid between first and second chambers, said brush seal element comprising:
    at least two brush stages, each brush stage including a bristle arrangement disposed between a back plate and a common mid plate forming a bypass chamber between said brush stages;
    a carrier, said carrier extending across said brush stages;
    a valve open to the first and second chambers; and
    wherein said valve allows the fluid to bypass a bristle arrangement if the fluid pressure varies between the chambers such that the fluid pressure in the bypass chamber (P3) is equal to the higher of the fluid pressure in the first chamber (P1) or the second chamber (P2).

2. The brush seal element of claim 1, wherein said valve allows the fluid to bypass the bristle arrangement adjacent to the chamber with the higher fluid pressure.

3. The brush seal element of claim 2, wherein said valve comprises a pressure conduit in the carrier and a bypass conduit in the mid plate, said conduits directing the fluid from the first or second chamber to the bypass chamber.

4. The brush seal element of claim 3, wherein said valve comprises several conduits in the carrier and the mid plate.

5. The brush seal element of claim 4, wherein the valve further comprises a spherical ball captured within the pressure conduit.

6. The brush seal element of claim 5, wherein the valve further comprises a seat between the pressure conduit and each of the first and second chambers, the seat being concave shaped.

7. The brush seal element of claim 6, wherein the carrier further comprises a threaded cap in the conduit for inserting a ball.

8. The brush seal element of claim 1, wherein the bristle arrangements are linear shaped.

9. The brush seal element of claim 1, wherein the bristle arrangements are arc shaped.

10. The brush seal element of claim 9, wherein the bristle arrangements are ring shaped.

11. A reverse flow tolerant brush seal comprising:
    at least two brush stages, each brush stage including a bristle arrangement disposed between a back plate and a common mid plate, the bristle arrangements including a free end extending beyond the mid and back plates forming a bypass chamber between said brush stages;
    a sealing surface, said sealing surface contacting the free ends and forming a restriction to fluid transfer between first and second pressurized chambers;
    a carrier, said carrier extending across said brush stages;
    a valve open to the first and second pressurized chambers; and
    wherein said valve allows the fluid to bypass a bristle arrangement if the fluid pressure varies between the chambers such that the fluid pressure in the bypass chamber (P3) is equal to the higher of the fluid pressure in the first chamber (P1) or the second chamber (P2).

12. The brush seal of claim 11, wherein said valve allows the fluid to bypass the bristle arrangement adjacent to the chamber with the higher fluid pressure.

13. The brush seal of claim 12, wherein said valve comprises a pressure conduit in the carrier and a bypass conduit in the mid plate, said conduits directing fluid from the first or second chamber to the bypass chamber.

14. The brush seal of claim 13, wherein said valve comprises several conduits in the carrier and the mid plate.

15. The brush seal of claim 14, wherein the valve further comprises a spherical ball captured within the conduit.

16. The brush seal of claim 15, wherein the valve further comprises a seat between the pressure conduit and each of the first and second chambers, the seat being concave shaped.

17. The brush seal of claim 16, wherein the carrier further comprises a threaded cap for inserting the ball into the pressure conduit.

18. The brush seal of claim 11, wherein the bristle arrangements are linear shaped.

19. The brush seal of claim 11, wherein the bristle arrangements are arc shaped.

20. The brush seal of claim 19, wherein the bristle arrangements are ring shaped.

* * * * *